(12) United States Patent
Kaiser et al.

(10) Patent No.: US 9,465,446 B2
(45) Date of Patent: Oct. 11, 2016

(54) ELECTRONIC DEVICE INCLUDING MECHANICAL KEYBOARD HAVING TOUCH SENSORS FOR DETECTING TOUCHES AND ACTUATION OF MECHANICAL KEYS

(71) Applicant: RESEARCH IN MOTION LIMITED, Waterloo (CA)

(72) Inventors: Devin Jay Kaiser, Kitchener (CA); John Edward Dolson, Carp (CA); Amit Pal Singh, Waterloo (CA)

(73) Assignee: BlackBerry Limited, Waterloo (CA)

( * ) Notice: Subject to any disclaimer, the term of this patent is extended or adjusted under 35 U.S.C. 154(b) by 260 days.

(21) Appl. No.: 13/826,192

(22) Filed: Mar. 14, 2013

(65) Prior Publication Data

US 2014/0267043 A1    Sep. 18, 2014

(51) Int. Cl.
G06F 3/02      (2006.01)
G06F 3/044     (2006.01)
G06F 3/0489    (2013.01)
G06F 3/0488    (2013.01)

(52) U.S. Cl.
CPC ............... G06F 3/021 (2013.01); G06F 3/044 (2013.01); G06F 3/0489 (2013.01); G06F 3/04883 (2013.01)

(58) Field of Classification Search
CPC ........................................................ G06F 3/021
See application file for complete search history.

(56) References Cited

U.S. PATENT DOCUMENTS

| | | | |
|---|---|---|---|
| 4,614,937 A | | 9/1986 | Poujois |
| 5,270,710 A | * | 12/1993 | Gaultier et al. ................ 341/33 |
| 6,970,126 B1 | | 11/2005 | O'Dowd et al. |
| 7,499,036 B2 | | 3/2009 | Flowers |
| 7,589,713 B2 | | 9/2009 | Sato |
| 8,174,507 B2 | | 5/2012 | XiaoPing |
| 8,200,866 B2 | | 6/2012 | Salman et al. |
| 8,207,872 B2 | | 6/2012 | Huang et al. |
| 8,264,382 B2 | | 9/2012 | Rigolle et al. |
| 8,310,381 B2 | | 11/2012 | Lin |
| 8,325,068 B2 | | 12/2012 | Wong et al. |
| 8,432,170 B1 | * | 4/2013 | Walsh ..................... G06F 3/044 324/658 |
| 8,773,146 B1 | * | 7/2014 | Hills ...................... G01N 27/22 324/658 |

(Continued)

FOREIGN PATENT DOCUMENTS

WO    2005/114369 A2    12/2005
WO    2013/002779 A1     1/2013

OTHER PUBLICATIONS

Extended European Search Report dated Jul. 22, 2013, issued in respect of corresponding European Patent Application No. 13159241.2.

(Continued)

*Primary Examiner* — Aneeta Yodichkas
*Assistant Examiner* — Karin Kyabu
(74) *Attorney, Agent, or Firm* — Borden Ladner Gervais LLP; Geoffrey deKleine

(57) ABSTRACT

An electronic device includes a keyboard. The keyboard includes a plurality of mechanical keys including a first key, and capacitive touch sensors including a first capacitive touch sensor and a second capacitive touch sensor. The keyboard is configured to detect a touch on the first key utilizing the first capacitive touch sensor and the second capacitive touch sensor, and to detect actuation of the first key when the first capacitive touch sensor is electrically coupled to the second capacitive touch sensor.

13 Claims, 4 Drawing Sheets

(56) References Cited

U.S. PATENT DOCUMENTS

| | | | |
|---|---|---|---|
| 8,810,544 B2* | 8/2014 | Liu | G06F 3/044 178/18.06 |
| 2003/0025679 A1 | 2/2003 | Taylor et al. | |
| 2005/0030048 A1 | 2/2005 | Bolender et al. | |
| 2007/0247431 A1 | 10/2007 | Skillman et al. | |
| 2007/0252729 A1 | 11/2007 | Li et al. | |
| 2008/0042978 A1 | 2/2008 | Perez-Noguera | |
| 2009/0128511 A1 | 5/2009 | Sinclair et al. | |
| 2010/0149125 A1 | 6/2010 | Klinghult et al. | |
| 2010/0149126 A1 | 6/2010 | Futter | |
| 2010/0259482 A1 | 10/2010 | Ball | |
| 2010/0291973 A1* | 11/2010 | Nakahara | G06F 3/044 455/566 |
| 2011/0141052 A1 | 6/2011 | Bernstein et al. | |
| 2011/0221680 A1 | 9/2011 | Karhiniemi et al. | |
| 2012/0013568 A1 | 1/2012 | Hung et al. | |
| 2012/0050167 A1 | 3/2012 | Krahenbuhl et al. | |
| 2012/0050177 A1 | 3/2012 | Simmons | |
| 2012/0062464 A1 | 3/2012 | Otagaki et al. | |
| 2012/0075221 A1 | 3/2012 | Yasuda | |
| 2012/0113007 A1* | 5/2012 | Koch et al. | 345/168 |
| 2012/0119996 A1 | 5/2012 | Wu et al. | |
| 2012/0154324 A1 | 6/2012 | Wright et al. | |
| 2012/0194476 A1 | 8/2012 | Lee et al. | |
| 2012/0212425 A1 | 8/2012 | Schmidt et al. | |
| 2013/0100071 A1 | 4/2013 | Wright et al. | |
| 2013/0194223 A1* | 8/2013 | Ward | G06F 1/3262 345/174 |
| 2013/0265276 A1* | 10/2013 | Obeidat | G06F 3/044 345/174 |
| 2014/0035824 A1* | 2/2014 | Bernstein | G06F 3/02 345/172 |

OTHER PUBLICATIONS

European Examination Report dated Dec. 11, 2015, issued against corresponding European Application No. 13159241.2.
Summons to attend oral proceedings dated Jul. 12, 2016, issued on corresponding European Application No. 13159241.2

* cited by examiner

ELECTRONIC DEVICE INCLUDING MECHANICAL KEYBOARD HAVING TOUCH SENSORS FOR DETECTING TOUCHES AND ACTUATION OF MECHANICAL KEYS

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
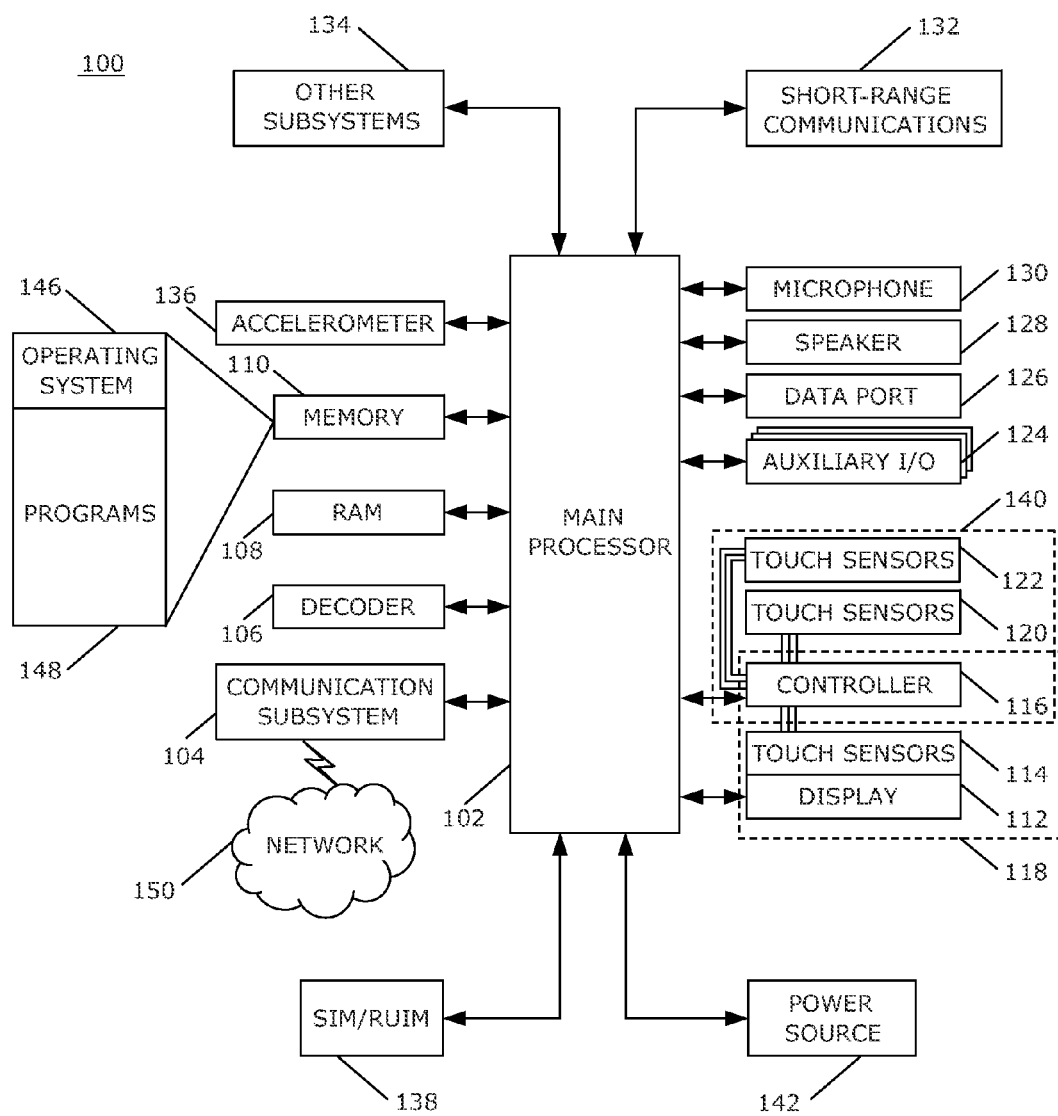
FIG. 1 is a block diagram of a portable electronic device in accordance with the disclosure.

The following describes an electronic device that includes a keyboard. The keyboard includes plurality of mechanical keys including a first key and capacitive touch sensors including a first capacitive touch sensor and a second capacitive touch sensor. The keyboard is configured to detect a touch on the first key utilizing the first capacitive touch sensor and the second capacitive touch sensor and to detect actuation of the first key when the first capacitive touch sensor is electrically coupled to the second capacitive touch sensor.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The electronic device may be a portable electronic device without wireless communication capabilities, such as a handheld electronic game, digital photograph album, digital camera, media player, e-book reader, and so forth.

A block diagram of an example of a portable electronic device 100 is shown in FIG. 1. The portable electronic device 100 includes multiple components, such as a processor 102, such as a microprocessor or discrete control circuitry, that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, a keyboard 140, an auxiliary input/output (I/O) subsystem 124, a data port 126, a speaker 128, a microphone 130, short-range communications 132 and other device subsystems 134. Short-range communications include, for example, Bluetooth® communications, near-field communications (NFC), and other short or limited range communications. The touch-sensitive display 118 includes a display 112 and touch sensors 114 that are coupled to a controller 116 that is utilized to interact with the processor 102. Input via a graphical user interface may be provided via the touch-sensitive display 118. Information, such as text, characters, symbols, images, icons, and other items that may be displayed or rendered on a portable electronic device, is displayed on the touch-sensitive display 118 via the processor 102. The keyboard 140 includes a first plurality of capacitive touch sensors 120 and a second plurality of capacitive touch sensors 122 that may be coupled to the controller 116. The controller 116 may be coupled to the keyboard 140 and the touch-sensitive display 118. Alternatively, the first capacitive touch sensors 120 and the second capacitive touch sensors 122 may be coupled to a different controller than the controller 116 for the touch-sensitive display 118. The first capacitive touch sensors 120 and the second capacitive touch sensors 122 are utilized to detect touches on mechanical keys of the keyboard 140 and to detect actuation of the mechanical keys. Input may be provided via the keyboard 140. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable capacitive touch-sensitive display, such as self-capacitance or mutual-capacitance. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
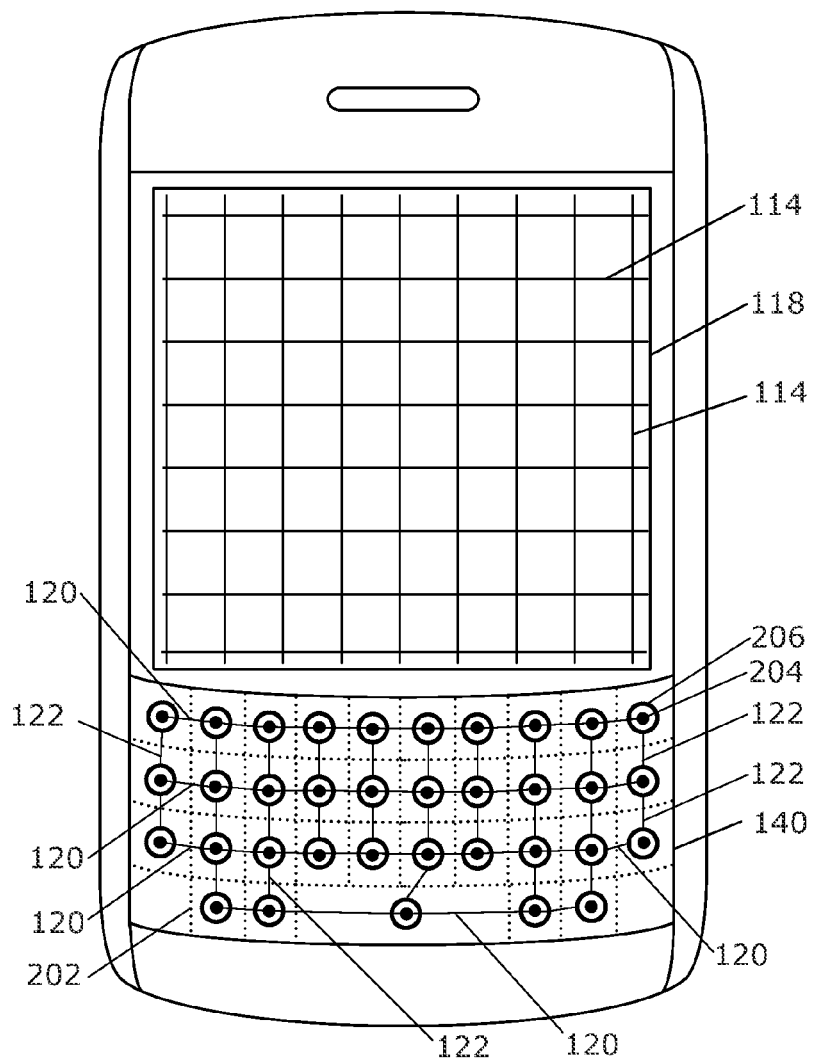
FIG. 2 is a front view of the portable electronic device in accordance with the disclosure.

A front view of a portable electronic device 100 is shown in FIG. 2. Two sets of touch sensors 114, also referred to as touch-sensing electrodes, are illustrated in the example of FIG. 2. The touch sensors 114 are shown for the purpose of illustration, but are not visible to the eye when viewing the portable electronic device 100 from the front.

The touch sensors 114 include drive electrodes that extend generally vertically in the view illustrated in FIG. 2. The drive electrodes may be disposed, for example, on a substrate, on a cover, or on any other suitable layer of the touch-sensitive display 118. The touch sensors 114 also include sense electrodes that extend generally horizontally in the view illustrated in FIG. 2. The drive electrodes are spaced from the sense electrodes by an interlayer dielectric, or insulator. Alternatively, the drive electrodes may extend generally horizontally and the sense electrodes may extend generally vertically. The terms "vertically" and "horizontally" are utilized herein to refer to the orientation of the portable electronic device 100 in the figures and are not otherwise limiting.

The drive electrodes and the sense electrodes are coupled to the controller 116 and are utilized for mutual-capacitance touch sensing. The controller 116 is configured to drive the drive electrodes while sensing changes in signals from the sense electrodes.

The keyboard 140 includes the mechanical keys 202, the first plurality of capacitive touch sensors 120, and the second plurality of capacitive touch sensors 122. Dome switches of the mechanical keys 202 comprise conductive discs 204 and conductive rings 206 disposed under key covers, also referred to as key caps, of the mechanical keys 202. Edges of mechanical keys 202 of the keyboard 140 are shown in dashed lines in FIG. 2 to simplify the drawing and to clearly illustrate the capacitive touch sensors 120, 122. The first plurality of capacitive touch sensors 120 and the second plurality of capacitive touch sensors 122 may be disposed on a substrate under the key caps of the mechanical keys 202. The first plurality of capacitive touch sensors 120 may extend generally horizontally. The conductive discs 204 of the mechanical keys 202 in one row of the keyboard 140 are part of one capacitive touch sensor 120. The second plurality of capacitive touch sensors 122 may extend generally vertically. The conductive rings 206 of the mechanical keys 202 in a column of the keyboard 140 are part of one capacitive touch sensor 122. The first plurality of capacitive touch sensors 120 are spaced from the second plurality of capacitive touch sensors 122 by a dielectric material or insulator such that the first capacitive touch sensors 120 and the second capacitive touch sensors 122 are not electrically coupled when the mechanical keys are not depressed.

The first plurality of capacitive touch sensors 120 and the second plurality of capacitive touch sensors 122 are coupled to the controller 116 and are utilized for touch sensing. For example, the x location component may be determined by a signal generated from a first capacitive touch sensor 120 of the first plurality of capacitive touch sensors 120, and the y location component may be determined by a signal generated from a second capacitive touch sensor 122 of the second plurality of capacitive touch sensors 122.

The mechanical keys 202 may comprise any suitable material. For example, the mechanical keys 202 may be plastic or rubber. The first plurality of capacitive touch sensors 120 and the second plurality of capacitive touch sensors 122 are configured to detect a touch, for example, on or near a key cap of a mechanical key 202 by detecting changes in signals when a touch occurs on the mechanical key 202. Self-capacitance touch sensing may be utilized to detect the touch through the cover of the mechanical key 202. A touch on the touch-sensitive display 118 alters the current through the capacitive touch sensors 120, 122 that are near the touch. The change in current through the capacitive touch sensors 120, 122 is detected by the touch controller 116. Alternatively, mutual-capacitance touch sensing may be utilized.

One or more touches on the keyboard 140 may be detected utilizing the first plurality of capacitive touch sensors 120 and the second plurality of capacitive touch sensors 122. The controller 116 and/or the processor 102 may determine a location of the touch and the associated key.

One or more gestures on the keyboard 140 may also be detected utilizing the first plurality of capacitive touch sensors 120 and the second plurality of capacitive touch sensors 122. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture on the keyboard 140 may also include a hover on a key or keys of the keyboard 140.

A gesture that begins on the keyboard 140 and continues to the touch-sensitive display 118 may also be detected. A gesture that begins on the touch-sensitive display 118 and continues on the keyboard 140 may also be detected. Such a gesture may be detected based on signals from the touch sensors 114 of the touch-sensitive display 118 and signals from the first plurality of capacitive touch sensors 120 and the second plurality of capacitive touch sensors 122 of the keyboard 140. The gesture may be identified as a single gesture based on the direction, the origin point, and the end point on both the keyboard 140 and the touch-sensitive display 118.

Figure 3:
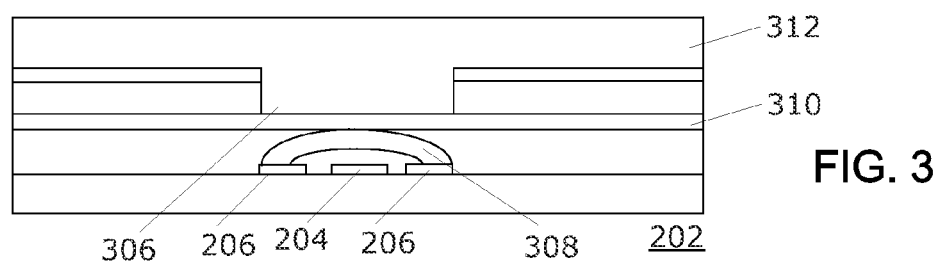
FIG. 3 and FIG. 4 are sectional side views of a key of the portable electronic device accordance with the disclosure.
Figure 4:
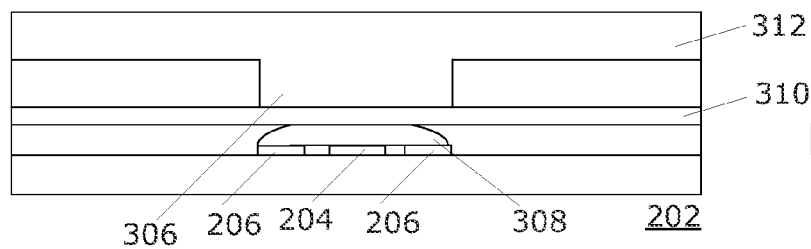

A sectional side view of a mechanical key 202 of the keyboard 140 is shown in FIG. 3 and FIG. 4. In this example, a first capacitive touch sensor 120 includes a plurality of conductive discs 204 that are electrically coupled together. The conductive discs 204 are disposed under key caps of the mechanical keys 202 such that one conductive disc 204 is associated with one mechanical key 202. The second plurality of capacitive touch sensors 122 include conductive rings 206 that are coupled together. The conductive rings 206 are centered relative to the conductive discs 204 and are spaced from the conductive discs 204. The conductive rings 206 are spaced from and electrically isolated from the conductive discs 204 such that the first plurality of capacitive touch sensors 120 and the second plurality of capacitive touch sensors 122 are not electrically coupled when no mechanical key is depressed or actuated, facilitating self-capacitance touch sensing. A touch on the touch-sensitive display 118 alters the current through the capacitive touch sensors 120, 122 that are near the touch. The change in current through the capacitive touch sensors 120, 122 is detected by the touch controller 116.

The mechanical key 202 includes a plunger 306 that is shaped to contact a substrate 310 above an elastically deformable conductive dome 308 that acts as a switch to temporarily electrically couple the conductive disc 204 and the conductive ring 206 when the conductive dome 308 is depressed. The conductive domes 308 for the mechanical keys 202 are coupled to the substrate 310. The conductive dome 308 for a mechanical key 202 is disposed above and spaced from the conductive disc 204 and is in contact with the conductive ring 206 when a key cap 312 of the key 202 is not depressed, as illustrated in FIG. 3. Thus, the conductive dome 308 is not in contact with the first capacitive touch sensor 120 when the key 202 is not depressed.

When the key cap 312 of the key 202 is depressed, as illustrated in FIG. 4, the plunger 306 moves downwardly and force is transferred through the substrate 310 to the conductive dome 308 of the mechanical key 202. The conductive dome 308 collapses and electrically couples the conductive disc 204 and the conductive ring 206. The first capacitive touch sensor 120 is electrically coupled to the second capacitive touch sensor 122, for example, by an electrical short circuit or electrical short, when the mechanical key 202 is depressed. The electrical coupling is detected by the controller 116, and the key 202 that is depressed is identified based on which first capacitive touch sensor 120 and which second capacitive touch sensor 122 caused the electrical coupling.

The mechanical keys 202 may be, for example, physically biased, by the elastically deformable conductive dome 308, into a position in which the conductive dome 308 of the mechanical keys 202 are spaced from and out of contact with the first capacitive touch sensors 120. A key 202 is depressed when sufficient force is applied to overcome the bias and cause the conductive dome 308 to collapse and contact the first capacitive touch sensor 120.

Figure 5:
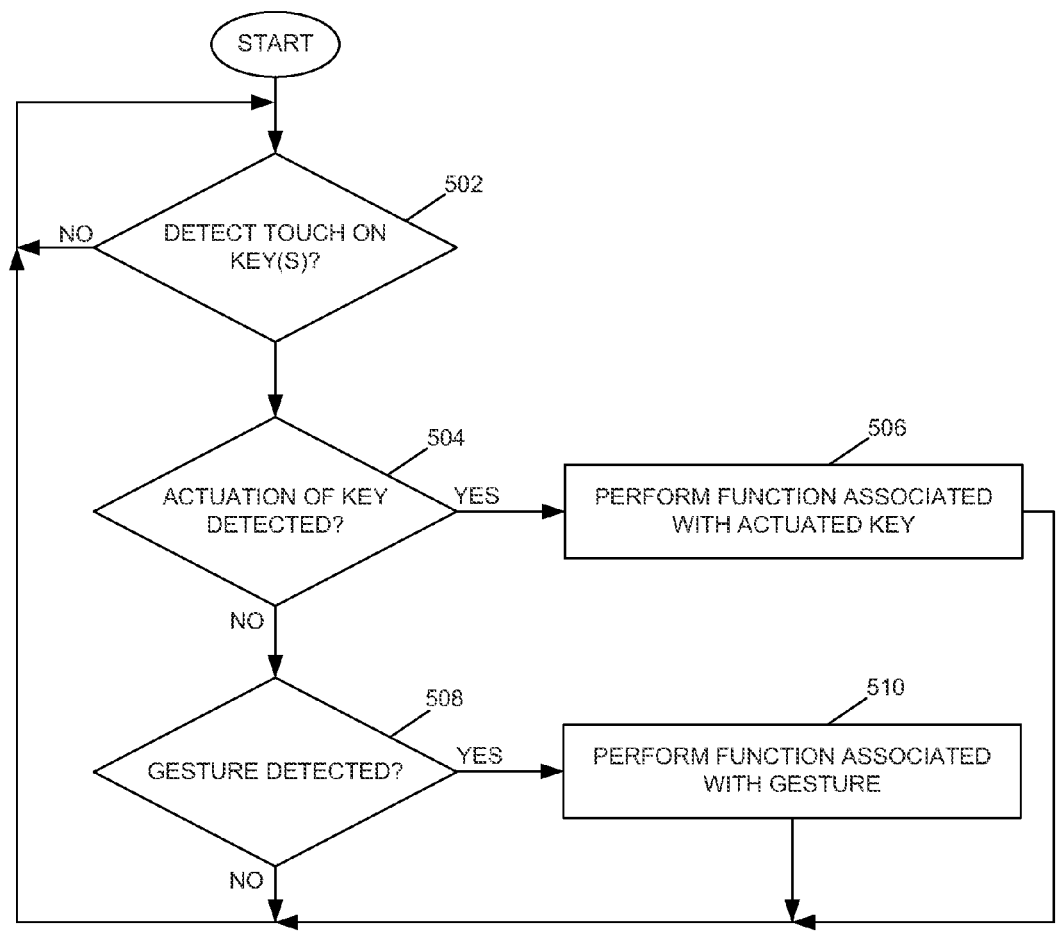
FIG. 5 is a flowchart illustrating a method of controlling the portable electronic device in accordance with the disclosure.

A flowchart illustrating a method of controlling the electronic device is shown in FIG. 5. The method may be carried out by software executed, for example, by the controller 116 and/or the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium device or apparatus, which may be a non-transitory or tangible storage medium, device, or apparatus.

When a touch on a mechanical key 202 or keys is detected 502 without depressing a mechanical key 202, the process continues at 504. The first plurality of capacitive touch sensors 120 and the second plurality of capacitive touch sensors 122 detect a touch by capacitive touch sensing. When actuation of a mechanical key is detected 504, an associated function is performed 506. Actuation of a mechanical key is detected by detecting electrical coupling of a first capacitive touch sensor 120 and a second capacitive touch sensor 122 that are both associated with the same mechanical key. The function associated with actuation of a mechanical key of a keyboard may be, for example, input of a character or function. When actuation of a mechanical key is not detected 504, the process continues at 508. When a gesture is detected 508, the gesture is identified and an associated function is performed 510. The gesture may be associated with more than one key 202 or may be a gesture performed on a single key 202, such as a tap, double tap, or hover, e.g., a touch sustained for a period of time at or near a single location.

Figure 6:
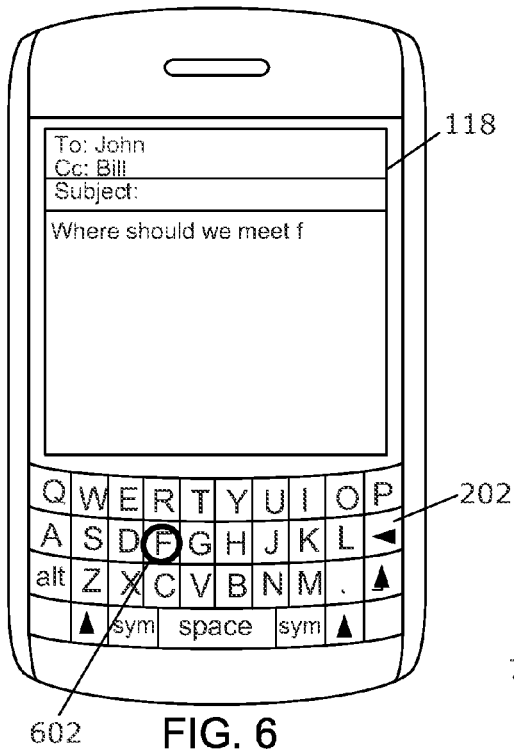
FIG. 6 through FIG. 8 illustrate examples of touch detection on mechanical keys of the portable electronic device in accordance with the disclosure.
Figure 7:
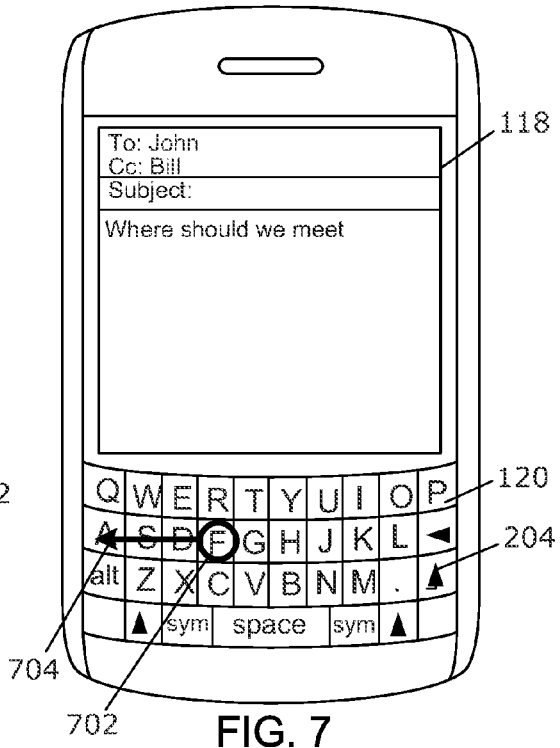
Figure 8:
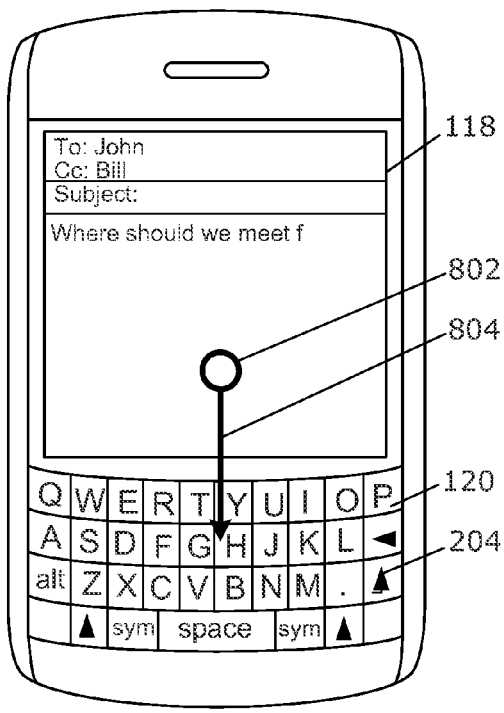

Examples of touch detection on mechanical keys of the electronic device 100 are illustrated in FIG. 6 through FIG. 8. In the example of FIG. 6, a touch, illustrated by the circle 602, is detected on a mechanical key 202 of the keyboard 140. In this example, the location of the touch is associated with the letter F. A first capacitive touch sensor 120 is electrically coupled to a second capacitive touch sensor 122 when the key is depressed and actuation of the mechanical key 202 of the keyboard 140 is detected. The location of the mechanical key 202 that is actuated is identified and the associate character, the letter F, is entered on the touch-sensitive display 118.

In the example of FIG. 7, a touch is first detected at the location illustrated by the circle 702. Actuation of a mechanical key 202 is not detected. In this example, the touch is a gesture that follows the path illustrated by the arrow 704 on the mechanical keys 202 of the keyboard 140. The gesture is successively detected on the keys along the path of the gesture and the gesture is identified. The associated function performed may be, for example, moving a cursor to the left.

In the example of FIG. 8, a gesture is detected on the touch-sensitive display 118 and on the keyboard 140. The gesture begins on the touch-sensitive display 118 at the location illustrated by the circle 802 and follows the path illustrated by the arrow 804. The gesture continues on the keyboard 140. The gesture is identified and the associated function is performed. The associated function may, for example, a shift lock function. The touch-sensitive display 118 and the touch sensors 120, 122 are configured to detect a touch that extends between the touch-sensitive display 118 and the touch sensors 120, 122. One (a single) gesture may be detected by both the touch-sensitive display 118 and the touch sensors 120, 122 of the keyboard. The continuation of a gesture from touch-sensitive display 118 to the touch sensors 120, 122 of the keyboard and from the touch sensors 120, 122 of the keyboard to the touch-sensitive display 118 is detectable.

An electronic device includes a keyboard comprising a first plurality of first touch sensors and a second plurality of touch sensors and configured to detect a touch on the keyboard by self-capacitance touch sensing and detect actuation of a mechanical key of the keyboard when a first touch sensor of the first plurality of touch sensors is electrically coupled to a second touch sensor of the second plurality of touch sensors.

Touch sensors of the keyboard detect a touch that is spaced from the touch-sensors by a key cap. Self-capacitance or mutual-capacitance touch sensing may be utilized. The same sensors that are utilized to detect a touch on a key are also utilized to detect actuation of a key when the sensors are electrically coupled. Thus, a touch on a key that does not depress a key is detectable and separate or additional electrical elements are not needed to detect actuation of the key.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An electronic device comprising:
a touch-sensitive display comprising a plurality of display touch sensors coupled to a touch-sensitive display controller and utilized to detect touches on the touch-sensitive display by mutual-capacitance touch sensing;
a mechanical keyboard comprising a plurality of mechanical keys, each associated with a pair of capacitive keyboard touch sensors such that a first key of the mechanical keyboard is associated with a first capacitive keyboard touch sensor, and a second capacitive keyboard touch sensor, the pair of capacitive keyboard touch sensors including the first capacitive keyboard touch sensor and the second capacitive keyboard touch sensor coupled to the touch-sensitive display controller and configured to:
  detect a touch on the first key of the mechanical keyboard utilizing the first capacitive keyboard touch sensor and the second capacitive keyboard touch sensor by self-capacitance touch sensing in which an x-location component of the touch is determined by a signal generated from the first capacitive keyboard touch sensor and a y-location component of the touch is determined by a signal generated from the second capacitive keyboard touch sensor;
  detect actuation of the first key of the mechanical keyboard when the first capacitive keyboard touch sensor is electrically coupled to the second capacitive keyboard touch sensor;
wherein the touch-sensitive display controller is utilized to detect touches on both the touch-sensitive display utilizing mutual-capacitance touch sensing and the mechanical keyboard utilizing self-capacitance touch sensing, and is configured to:
  detect a gesture that begins on one of the touch-sensitive display and the mechanical keyboard and continues to another of the touch-sensitive display and the mechanical keyboard such that the touch-sensitive display controller detects the gesture detected on both the touch-sensitive display and the mechanical keyboard; and
  identify the gesture on both the touch-sensitive display and the mechanical keyboard as a single gesture.

2. The electronic device according to claim 1, further comprising a third capacitive keyboard touch sensor and a fourth capacitive keyboard touch sensor that are utilized to detect touches on a second key and detect actuation of the second key based on electrical coupling of the third capacitive keyboard touch sensor and the fourth capacitive keyboard touch sensor.

3. The electronic device according to claim 1, wherein the touch-sensitive display and the first capacitive keyboard touch sensor and the second capacitive keyboard touch sensor are configured to detect that the gesture that begins on the touch-sensitive display and continues from the touch-sensitive display to the mechanical keyboard.

4. The electronic device according to claim 1, wherein a plurality of capacitive keyboard touch sensors are configured to detect a keyboard gesture on the mechanical keyboard.

5. A method comprising:
   detecting, utilizing a touch-sensitive display controller and a plurality of display touch sensors, a touch on a touch-sensitive display of an electronic device by mutual-capacitance touch sensing;
   detecting, utilizing the touch-sensitive display controller, a first capacitive keyboard touch sensor, and a second capacitive keyboard touch sensor, a touch on a mechanical key of a mechanical keyboard of the electronic device by self-capacitance touch sensing in which an x-location component of the touch is determined by a signal generated from the first capacitive keyboard touch sensor and a y-location component of the touch is determined by a signal generated from the second capacitive keyboard touch sensor;
   when the first capacitive keyboard touch sensor is electrically coupled to the second capacitive keyboard touch sensor, detecting actuation of the mechanical key; and
   utilizing the touch-sensitive display controller to:
      detect touches on both the touch-sensitive display utilizing mutual-capacitance touch sensing and the mechanical keyboard utilizing self-capacitance touch sensing, and
      in response to detecting a gesture that begins on one of the touch-sensitive display and the mechanical keyboard and continues to another of the touch-sensitive display and the mechanical keyboard such that the gesture is detected on both the touch-sensitive display and the mechanical keyboard, identify the gesture detected on both the touch-sensitive display and the mechanical keyboard as a single gesture.

6. The method according to claim 5, comprising detecting a keyboard gesture on the mechanical keyboard utilizing a plurality of capacitive keyboard touch sensors including the first capacitive keyboard touch sensor and the second capacitive keyboard touch sensor.

7. The method according to claim 5, comprising detecting that the gesture is one gesture that is detected along a path on both the mechanical keyboard and the touch-sensitive display of the electronic device.

8. A non-transitory computer-readable medium having computer-readable code stored thereon, the computer-readable code executable by at least one processor of an electronic device to cause the electronic device to perform the method of claim 5.

9. An electronic device comprising:
   a touch-sensitive display comprising a plurality of display touch sensors coupled to a touch-sensitive display controller for detecting touches on the touch-sensitive display by mutual-capacitance touch sensing;
   a mechanical keyboard comprising a first plurality of capacitive keyboard touch sensors and a second plurality of capacitive keyboard touch sensors that are coupled to the touch-sensitive display controller and configured to:
      detect a touch on the mechanical keyboard by self-capacitance touch sensing in which an x-location component of the touch is determined by a signal generated from one of the first plurality of capacitive keyboard touch sensors and a y-location component of the touch is determined by a signal generated from one of the second plurality of capacitive keyboard touch sensors;
      detect actuation of a mechanical key of the mechanical keyboard when a first keyboard touch sensor of the first plurality of capacitive keyboard touch sensors is electrically coupled to a second keyboard touch sensor of the second plurality of capacitive keyboard touch sensors;
   wherein the touch-sensitive display controller is utilized to detect touches on both the touch-sensitive display utilizing mutual-capacitance touch sensing and the mechanical keyboard utilizing self-capacitance touch sensing, and is configured to:
      detect a gesture that begins on one of the touch-sensitive display and the mechanical keyboard and continues to another of the touch-sensitive display and the mechanical keyboard such that the touch-sensitive display controller detects the gesture on both the touch-sensitive display and the mechanical keyboard; and
      identify the gesture detected on both the touch-sensitive display and the mechanical keyboard as a single gesture.

10. The electronic device according to claim 9, wherein a third keyboard touch sensor of the first plurality of capacitive keyboard touch sensors and a fourth keyboard touch sensor of the second plurality of capacitive keyboard touch sensors are associated with a second mechanical key of the mechanical keyboard to detect touches on the second mechanical key and to detect actuation of the second mechanical key when the third keyboard touch sensor is electrically coupled to the fourth keyboard touch sensor.

11. The electronic device according to claim 9, wherein the touch-sensitive display and the first plurality of capacitive keyboard touch sensors and the second plurality of capacitive keyboard touch sensors are configured to detect that the gesture is one gesture that extends along a path on both the touch-sensitive display and the mechanical keyboard.

12. The electronic device according to claim 9, wherein the first plurality of capacitive keyboard touch sensors and the second plurality of capacitive keyboard touch sensors are utilized to detect touches by self-capacitance touch sensing.

13. The electronic device according to claim 9, wherein the first plurality of capacitive keyboard touch sensors and the second plurality of capacitive keyboard touch sensors of the keyboard are configured to detect a keyboard gesture on the mechanical keyboard.

* * * * *